United States Patent
Ramberg et al.

(10) Patent No.: US 6,456,644 B1
(45) Date of Patent: *Sep. 24, 2002

(54) BANDPASS CORRELATION OF A SPREAD SPECTRUM SIGNAL

(75) Inventors: Erik A. Ramberg, San Francisco, CA (US); Robert K. Froelich, Sunnyvale, CA (US); Forrest F. Fulton, Los Altos Hills, CA (US)

(73) Assignee: Cellnet Data Systems, Inc., San Carlos, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/880,578

(22) Filed: Jun. 23, 1997

(51) Int. Cl.$^7$ ................................................ H04L 27/30
(52) U.S. Cl. ........................ 375/130; 375/140; 375/142; 375/143; 375/150
(58) Field of Search ................................ 375/254, 329, 375/367, 344, 130, 140, 132, 142, 147, 150; 370/342, 479; 455/296

(56) References Cited

U.S. PATENT DOCUMENTS

| | | | |
|---|---|---|---|
| 4,225,935 A | 9/1980 | Zscheile, Jr. et al. | 364/267.04 |
| 4,295,204 A | 10/1981 | Sunstein | 364/824 |
| 4,320,513 A | 3/1982 | Lampert | 370/342 |
| 4,465,153 A | 8/1984 | van de Pas et al. | 380/47 |
| 4,477,912 A | 10/1984 | Russell | 375/367 |
| 4,567,588 A | 1/1986 | Jerrim | 370/479 |
| 4,621,365 A | 11/1986 | Chiu | 375/149 |
| 4,707,839 A | 11/1987 | Andren et al. | 375/1 |
| 4,730,340 A | 3/1988 | Frazier, Jr. | 375/268 |
| 4,761,795 A | 8/1988 | Beier | 375/149 |
| 4,785,463 A | * 11/1988 | Janc et al. | 375/206 |
| 4,841,544 A | 6/1989 | Nuytkens | 375/206 |
| 5,305,349 A | 4/1994 | Dent | 375/1 |
| 5,377,232 A | 12/1994 | Davidov et al. | 375/354 |
| 5,383,220 A | 1/1995 | Murai | 375/206 |
| 5,414,729 A | 5/1995 | Fenton | 375/149 |
| 5,414,730 A | 5/1995 | Lundquist et al. | 375/208 |
| 5,422,909 A | 6/1995 | Love et al. | 375/200 |
| 5,440,597 A | 8/1995 | Chung et al. | 375/149 |
| 5,479,442 A | * 12/1995 | Yamamoto | 375/206 |
| 5,511,090 A | 4/1996 | Denton et al. | 375/205 |
| 5,521,938 A | 5/1996 | Stewart et al. | 375/206 |

(List continued on next page.)

FOREIGN PATENT DOCUMENTS

JP        9-135150        5/1997

OTHER PUBLICATIONS

H. Lan et al., Rapid Acquisition Schemes for CDMA Systems in a Multipath Delay and Fading Environment, IEEE, pp. 593–597, 5/94.

J. Šimša et al., Comparison of Mulitple–Dwell Code Acquisition Detector Rules in DS–SS Serial Search by Envelope Correlator, IEEE, pp. 614–618, 5/94.

J. J. Freeman, The Action of Dither in a Polarity Coincidence Correlator, *IEEE Transactions on Communications* pp. 857–861, 6/74.

(List continued on next page.)

Primary Examiner—Stephen Chin
Assistant Examiner—Shu Wang Liu
(74) Attorney, Agent, or Firm—Fish & Richardson, P.C.

(57) ABSTRACT

A spread spectrum signal is processed after it is sampled at a selected sampling rate and tuned to a center frequency lower than the sampling rate and greater than zero. The signal is multiplied against a reference signal to produce a corresponding product output, and an accumulation output is formed by combining the product output with a phase-shifted version of the accumulation output.

23 Claims, 11 Drawing Sheets

U.S. PATENT DOCUMENTS

| | | | |
|---|---|---|---|
| 5,528,624 A | | 6/1996 | Kaku et al. .................. 375/148 |
| 5,574,721 A | | 11/1996 | Magill ......................... 375/206 |
| 5,577,025 A | | 11/1996 | Skinner et al. ............... 370/22 |
| 5,577,066 A | * | 11/1996 | Scuchman et al. .......... 375/254 |
| 5,596,601 A | | 1/1997 | Bar-David .................. 375/207 |
| 5,612,972 A | | 3/1997 | Fukushi et al. ............. 375/206 |
| 5,623,511 A | | 4/1997 | Bar-David et al. .......... 375/207 |
| 5,638,362 A | * | 6/1997 | Dohi et al. .................. 370/342 |
| 5,640,416 A | * | 6/1997 | Chalmers .................... 375/206 |
| 5,691,974 A | | 11/1997 | Zehavi et al. ............... 370/203 |
| 5,719,899 A | | 2/1998 | Thielecke et al. .......... 375/206 |
| 5,754,584 A | | 5/1998 | Durrant et al. ............. 375/206 |
| 5,787,125 A | * | 7/1998 | Mittel ......................... 375/329 |
| 5,796,776 A | | 8/1998 | Lomp et al. ................ 375/222 |
| 5,805,584 A | | 9/1998 | Kingston et al. ........... 370/342 |
| 5,805,648 A | | 9/1998 | Sutton ......................... 375/367 |
| 5,862,139 A | | 1/1999 | Yanagi ....................... 370/441 |
| 5,881,098 A | * | 3/1999 | Tzou .......................... 375/152 |
| 6,047,017 A | | 4/2000 | Cahn et al. ................. 375/148 |

OTHER PUBLICATIONS

C.R. Cahn, Performance of Digital Matched Filter Correlator with Unknown Interference, *IEEE Transactions on Communication Technology*, pp. 1163–1171, 12/71.

F. Amoroso, Performance of the Adaptive A/D Converter in combined CW and Gaussian Interference, *IEEE*, 539–558, 3/84.

J.L. Bricker, Mathematical Methodology for Analysis of the Adaptive A/D Converter in Combined CW and Gaussian Interference, *IEEE*, pp. 545–551, 1984.

John D. Endsley, et al., Multi–Access Properties of Transform Domain Spread Spectrum Systems, Dept. of Defense, p. 505.

R. Kuc, Introduction to Digital Signal Processing, *McGraw–Hill Inc.*, pp. 139–142, 1988.

K.V. Cai, Optimization of 2–Bit A/D Adaptive Converter Performance in CW Interference, *IEEE*, pp. 552–558, 1984.

I. Okazaki et al., Spread Spectrum Pulse Position Modulation—A Simple Approach for Shannon's Limit, *IEICE Trans. Commun.*, vol. E76–8, No. 8, Aug. 1993.

* cited by examiner

| Chip # | Symbol Phase |
|---|---|
| 0 | Symbol 0 |
| 1 | |
| 2 | Symbol 1 |
| 3 | |
| 4 | Symbol 2 |
| 5 | |
| 6 | Symbol 3 |
| 7 | |
| 8 | Symbol 4 |
| 9 | |
| 10 | Symbol 5 |
| 11 | |
| 12 | Symbol 6 |
| 13 | |
| 14 | Symbol 7 |
| 15 | |
| 16 | Symbol 8 |
| 17 | |
| 18 | Symbol 9 |
| 19 | |
| 20 | Symbol 10 |
| 21 | |
| 22 | Symbol 11 |
| 23 | |
| 24 | Symbol 12 |
| 25 | |
| 26 | Symbol 13 |
| 27 | |
| 28 | Symbol 14 |
| 29 | |
| 30 | Symbol 15 |
| 31 | |

| 62 | |

FIGURE 4

BANDPASS CORRELATION OF A SPREAD SPECTRUM SIGNAL

RELATED APPLICATIONS

This application is related to the following co-pending applications, all filed on the same day and naming the same inventors as this application: "Processing a Spread Spectrum Signal in a Frequency Adjustable System"; "Bandpass Processing of a Spread Spectrum Signal"; "Acquiring a Spread Spectrum Signal"; and "Receiving a Spread Spectrum Signal".

BACKGROUND OF THE INVENTION

The invention-relates to processing a spread spectrum signal.

In wireless systems, information typically is transmitted by modulating the information onto carrier waves having frequencies that lie within preassigned frequency bands. Radio frequency (RF) receivers demodulate the carrier waves to recover the transmitted information.

Spread spectrum communication systems spread transmitted signals over bandwidths much larger than those actually required to transmit the information. Spreading a signal over a wide spectrum has several advantages, including reducing the effects of narrow band noise on the signal and, in many situations, providing increased protection against interception by unwanted third parties. In a direct sequence spread spectrum (DSSS) system, the bandwidth of a transmitted signal is increased by modulating the signal onto a known pseudo-noise (PN) signal before modulating onto the carrier wave. The PN signal typically is a digital signal having an approximately equal number of high and low bits (or "chips"), which maximizes the spectrum over which the signal is spread. A typical implementation of a DSSS receiver recovers the transmitted information by demodulating the carrier wave and then multiplying the resulting signal with a local replica of the PN signal to eliminate the PN signal. The DSSS technique offers heightened security because the receiver must know the PN sequence used in the transmission to recover the transmitted information efficiently. Other spread spectrum techniques include frequency hopped spread spectrum (FHSS).

SUMMARY OF THE INVENTION

In one aspect, the invention features processing a spread spectrum signal digitally sampled at a selected sampling rate and tuned to a center frequency lower than the sampling rate. The digitally sampled spread spectrum signal is multiplied against a reference signal to produce a corresponding product output, and an accumulation output is formed by combining the product output with a phase-shifted version of the accumulation output.

Embodiments of the invention may include one or more of the following features. The center frequency may be set to equal approximately one-quarter the sampling rate. The accumulation output may be phase-shifted by 180° or 360° before it is combined with the product output. A delay element may be used to shift the accumulation output by two or four samples to produce the 180° or 360° phase-shifted version of the accumulation output, which may be accomplished using two or four, respectively, single-sample delay registers.

Advantages of the invention may include one or more of the following. A spread spectrum signal may be processed without demodulating the signal to DC until the processing is complete. An AC-coupled filter or other DC block may be used to eliminate DC offset from the spread spectrum signal before it is processed. A direct sequence spread spectrum signal may be processed using a correlator with an implementation efficient structure. For example, if the spread spectrum signal is processed at a center frequency equal to one-quarter the digital sampling rate ($F_s/4$), the signal may be processed by a correlator structure that produces an accumulation output simply by subtracting from the output of a multiplier a 180° phase-shifted version of the accumulation output formed by delaying the accumulation output by two samples. Such a correlator may be constructed using very few and inexpensive components, which will lower the cost of DSSS receivers using the structure. Such a correlator structure also will improve the capabilities and efficiency of such receivers.

Other advantages of the invention will become apparent from the following description and from the claims.

BRIEF DESCRIPTION OF THE DRAWINGS

The accompanying drawings, which are incorporated in and constitute a part of the specification, illustrate embodiments of the invention and, together with the general description above and the detailed description below, serve to explain the principles and advantages of the invention.

FIG. 4 is chart showing the code phases of a possible 16-CCSK alphabet generated from a 63-chip PN sequence.

DESCRIPTION OF THE PREFERRED EMBODIMENTS

Figure 1:
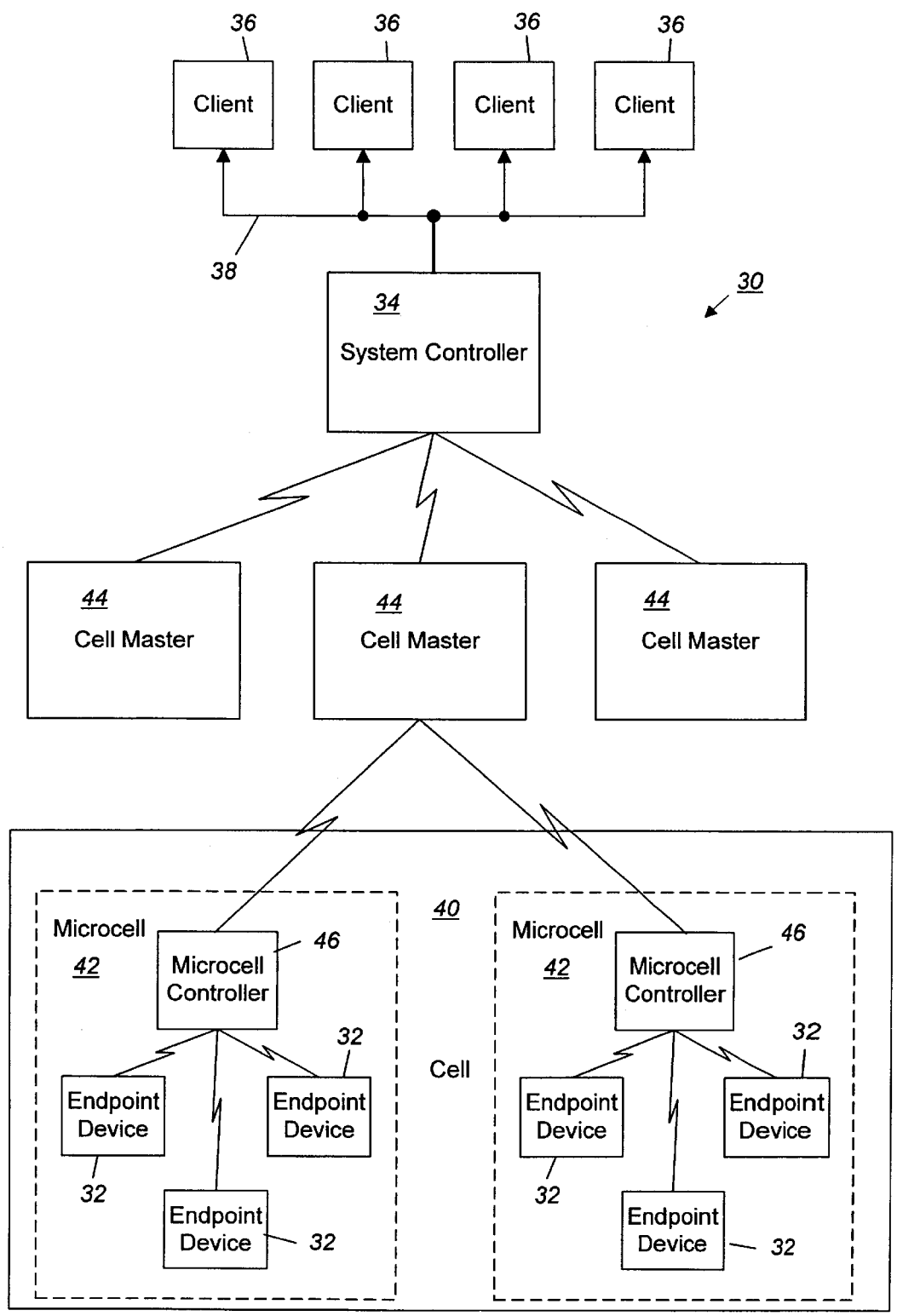
FIG. 1 is a block diagram of a wireless local area network (LAN).

Referring to FIG. 1, spread spectrum technology is particularly suited for use in a wireless network 30 in which many devices (e.g., radios) transmit different streams of information within a relatively small geographic area. The wireless network 30 may be used in remote monitoring applications, e.g., by large utility companies to monitor resource consumption remotely. A network 30 used in such a manner typically consists of a large number of end point devices 32, such as devices that record resource consumption at utility meters (e.g., electricity meters) located at business and residential structures throughout a metropolitan area. The end point devices 32 gather information and, using internal wireless radio transceivers (not shown in the figure), periodically transmit the information as digital data packets through a hierarchical network to a system controller 34. System controller 34 typically includes a network server computer (not shown in the figure) that may distribute the information to clients 36 on a computer network 38. In larger metropolitan areas, end point devices 32 in the wireless network 30 may be organized into "cells" 40, which may be divided into "microcells" 42. Typically, microcells 42 cover relatively small geographic areas of similar size or containing a similar number of end point devices 32. Each cell 40 is governed by a cell master 44, which oversees operation of the end point devices 32 within the cell 40 and relays information between the system controller 34 and the end point devices 32 in the cell 40. Likewise, each microcell 42 is governed by a microcell controller 46, which supervises the operation of all end point devices 32 in the microcell 42 and which relays information between the corresponding cell master 44 and the end point devices 32 in the microcell 42.

The wireless network 30 should include as few microcell controllers 46 as possible since each controller 46 adds to the total cost of installing and administering the network 30. The number of microcell controllers 46 required in a given geographical area depends upon the minimum signal strength ("sensitivity") at which each controller 46 can recover information contained in transmissions from the end point devices 32 in the corresponding microcell 42. The cost of the wireless network 30 may be reduced and its dynamic capabilities may be expanded if the wireless radios used in the communicating devices (e.g., system controller 34, cell masters 44, microcell controllers 46, and end point devices 32) in the network 30 were to include more efficient components than those currently available.

The invention is suited for use in a wireless network such as that shown in FIG. 1 and in direct sequence spread spectrum (DSSS) systems in which cyclic code shift keying (CCSK) is used to modulate digital data onto digital pseudo-noise (PN) spreading sequences. CCSK is a modulation technique in which circular phase shifts of a PN sequence are used to represent the possible constellation (or data) symbols. For example, a 63-chip PN sequence could support up to 63 different data symbols, each of which would be 63-chips in length. An M-CCSK constellation (or alphabet) is a group of M CCSK data symbols, each representing a unique combination of binary data bits, where M is an integer greater than one. Spread spectrum communication systems using CCSK and related data modulation techniques are described in U.S. Pat. No. 4,707,839, issued to Andren et al., on Nov. 17, 1987, and U.S. Pat. No. 4,730,340, issued to Frazier, Jr., et. al, on Mar. 8, 1988, both of which are incorporated herein by reference. The invention will be described in the context of a DSSS system using CCSK data modulation, but the invention is not limited to use in such a system.

Figure 2:
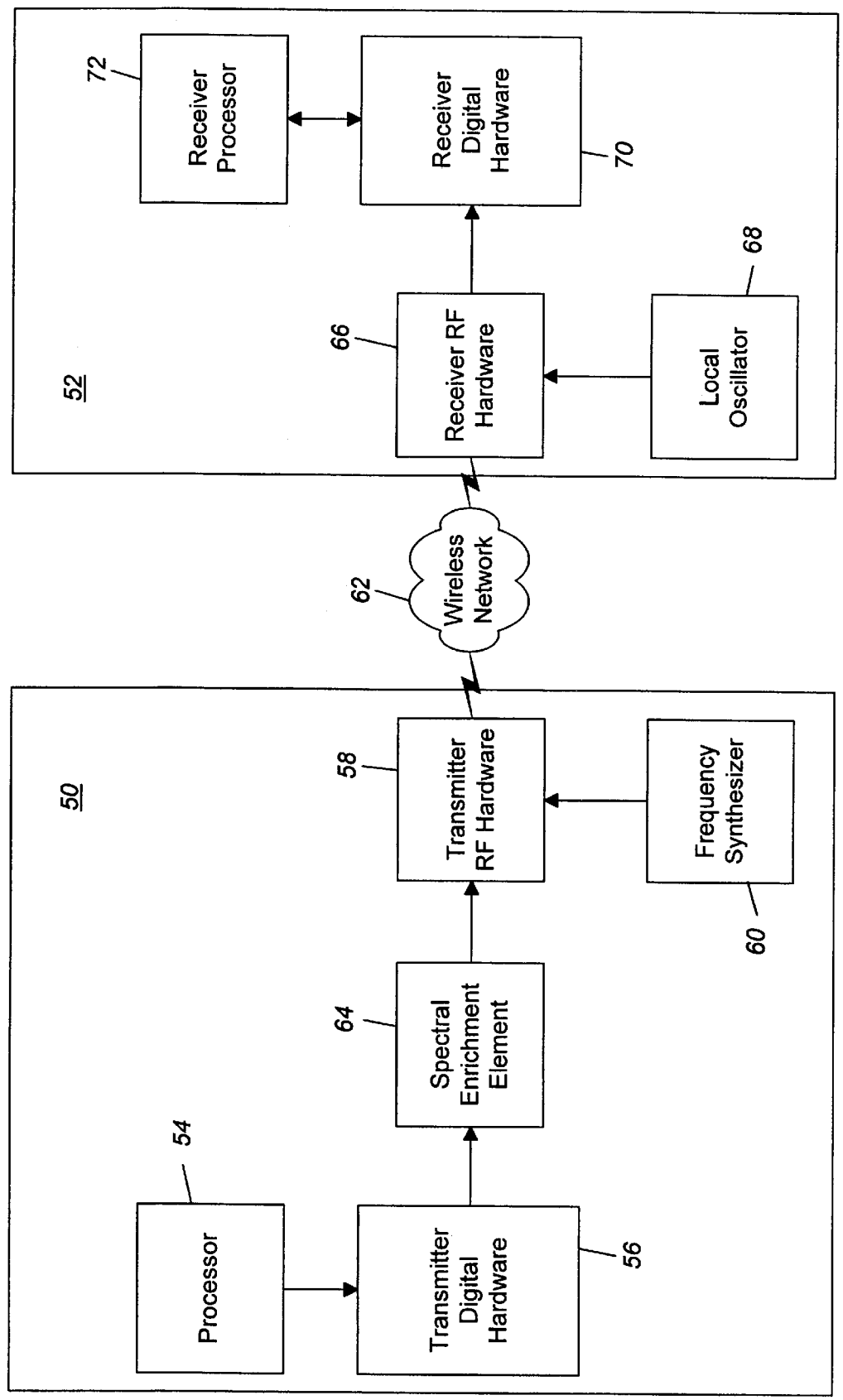
FIG. 2 is a block diagram of a transceiver for use in a wireless Network such as that shown in FIG. 1.

Referring also to FIG. 2, each radio in the system controller 34, cell masters 44, microcell controllers 46, and end point devices 32 of the DSSS wireless network 30 of FIG. 1 includes a transmitter 50 and a receiver 52 equipped to send and receive, respectively, spread spectrum signals carrying information encoded onto a PN sequence with CCSK modulation. In the transmitter 50, data to be transmitted is generated by a computing device, such as a microprocessor 54. A digital hardware block 56 receives the data, along with instructions for processing it, from the processor 54 and modulates the data onto a predetermined PN sequence to form a spread spectrum signal. An RF hardware block 58 then modulates the spread spectrum signal onto an RF carrier wave (e.g., a wave in the ISM band ranging from 902 MHZ to 928 MHZ), the frequency of which is determined by frequency synthesizer 60, and transmits the combined signal over a wireless transmission channel 62. The transmitter 50 also may include a spectral enrichment block 64, which further improves the transmitter's spreading qualities by modulating an additional PN sequence over the CCSK modulated primary PN sequence, as discussed below.

The transmitted RF signal is received by the receiver 52 and may be down converted to an intermediate frequency (IF) by an RF hardware block 66 controlled by a local oscillator (LO) 68. The intermediate frequency is selected according to the following equation:

$$IF = F_s \cdot (N \pm \frac{1}{4}),$$

where $F_s$ is the sampling rate of an A/D converter (discussed below) and N is an integer. A digital hardware block 70 in the receiver 52 samples the IF signal and converts the samples to digital representation. The digital hardware block 70 then demodulates the spread spectrum signal to recover the encoded digital data. A processor 72 in the receiver controls the operation of the digital hardware block 70 and uses the recovered data as specified by firmware and software associated with the processor 72. Within each device in the wireless network 30, a single processor may be used to control both the transmitter 50 and the receiver 52.

The primary PN sequence (or "code") used to create the spread spectrum signal consists of a predetermined number of repeating binary code bits (or "chips"), approximately half of which have a binary value of "1" and the rest of which have a binary value of "-1". Evenly distributing the number of high and low chips in this manner maximizes the spreading quality of the PN code. During a single code period of the PN sequence, the chips in the sequence are generated one time in succession. The transmitter's digital hardware block 56 modulates digital data from the processor 54 onto the primary PN code by adjusting the starting point of the PN sequence at the beginning of each code period, as discussed below. By adjusting the starting point of the PN code, the digital hardware block 56 creates "code phase shifts" in the code, each of which represents a different data "symbol" identifying a unique combination of data from the processor. The maximum number of data bits identified by each data symbol depends on the length of the PN code and the size of the code phase shifts separating the data symbols. Since data symbols typically should be separated by phase shifts of at least two chips to allow adequate reception, a PN code comprising $2^M$ chips may support an alphabet of $2^{M-1}$ symbols encoding M−1 bits of digital data. For example, a 64-chip PN code (M=6) may support up to 32 ($2^5$) symbols that encode up to 5 bits of binary data. In this manner, CCSK modulation allows for the transmission of several bits of digital data for each period of the spreading sequence, which reduces the duration of transmitted packets and which, in turn, improves the efficiency of devices in the wireless network.

Figure 3:
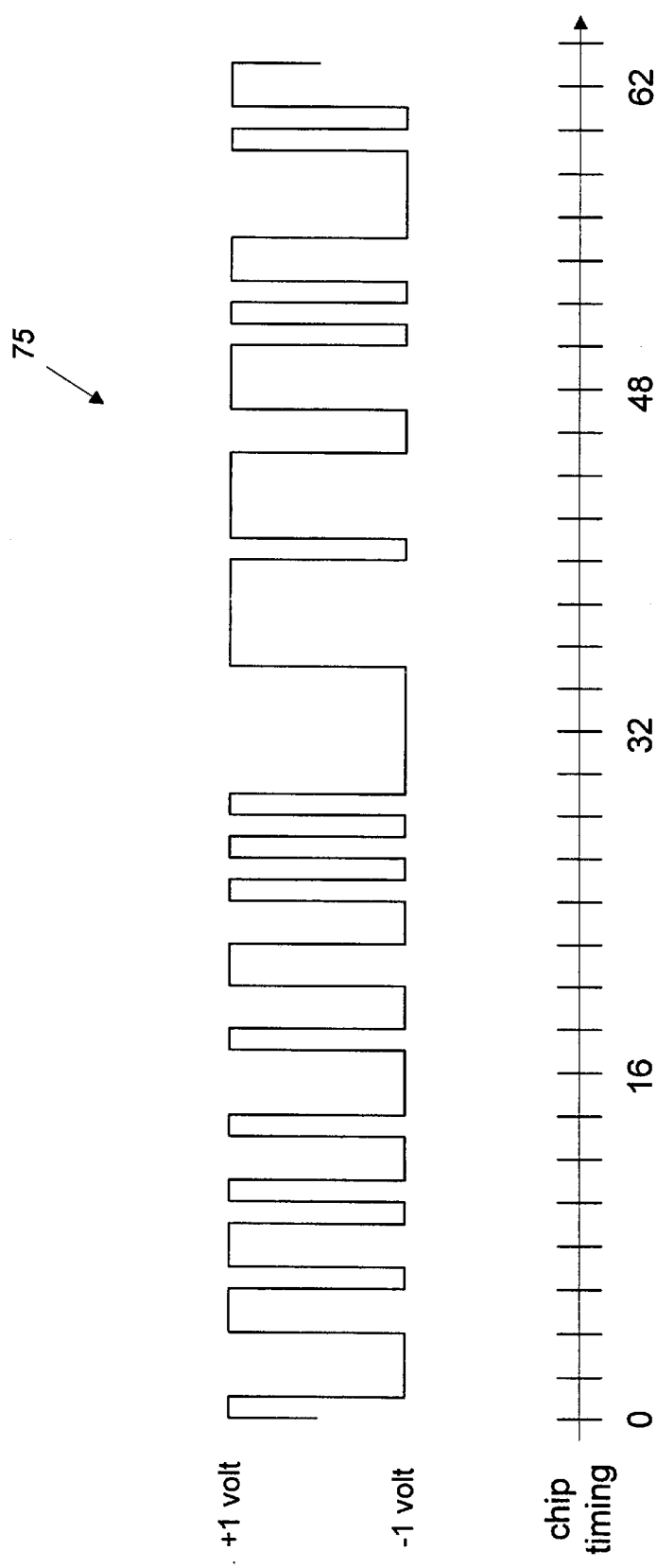
FIG. 3 is waveform illustrating one period of a 63-chip PN sequence.

Referring to FIG. 3, a suitable PN code may be generated with standard electronic components. One such code is the 63-chip code 75 of FIG. 3, which represents one of the maximal length sequences that may be generated using a standard 6-bit feedback shift register. The 63-chip sequence 75 ideally is generated at a code frequency of approximately 19.2 kHz, so each code period of the sequence has a total duration of approximately 52 μsec. Therefore, each chip has a duration of approximately 825 nsec, and the chip rate is approximately 1.2 Mchip/sec. Multiplying the RF carrier wave by this spreading sequence converts the carrier spectrum from an impulse at the carrier frequency in the ISM band to a sin(x)/x (sinc function) shape, where the first nulls of the sinc function are offset by approximately ±1.2 MHZ from the carrier frequency. The fine structure of the spread spectrum carrier includes spectral lines at a spacing approximately 19.2 kHz.

Referring also to FIG. 4, four bits of digital data may be modulated onto the 63-chip PN code 75 for each code period. Since four digital bits may take on sixteen different values, the four bits are represented by sixteen different code phases of the PN code, each formed by starting the PN code at a corresponding one of the sixty-three chips ("16-CCSK" modulation). While any allocation of code phases at least two chips apart may be used to generate a sixteen symbol alphabet, one simple alphabet includes a first symbol ("symbol 0") that begins with the first chip ("chip 0") of the PN code 75 and fifteen other symbols ("symbol 1" through "symbol 15") that each begin exactly two chips behind the preceding symbol. Since one symbol is transmitted for every period of the PN code, the data symbol rate equals the code frequency (19.2 kHz), and the digital data transmission rate is four times the code frequency (76.8 kbits/sec).

To recover 16-CCSK modulated data, a receiver must determine which of the sixteen PN code phases was used in the spreading process. The receiver 52 of FIG. 2 accomplishes this by correlating, in parallel, the received signal against sixteen locally generated copies of the PN sequence, where each copy has a code phase shift corresponding to one of the sixteen symbol values. At the end of each symbol period, the receiver determines the symbol value by determining which copy of the PN sequence produced a correlation peak. The symbol phases should be separated by at least two chips to minimize errors by avoiding correlation overlap. The data recovery process, including signal correlation, is described in more detail below.

As mentioned above, each transmitter may include a spectral enrichment block that further improves the spreading qualities of the transmitter. Spectral enrichment superimposes a relatively slow, repeating binary sequence, also having logic levels of ±1, on top of the primary PN sequence. The enrichment sequence may be, e.g., a 15-chip sequence that has a chip rate equal to one-half of the symbol rate (e.g., approximately 9600 kHz). Therefore, each chip in the enrichment sequence covers two periods of the primary PN sequence, and the sequence changes values only at symbol boundaries. Modulating the spectral enrichment signal over the modulated PN sequence can allow the transmitter to operate at higher power levels without violating FCC power regulations. Spectral enrichment is described in more detail in U.S. patent application Ser. No. 08/473,091, entitled "Direct Sequence Spread Spectrum System," filed by Forrest F. Fulton on Jun. 6, 1995.

Figure 5:
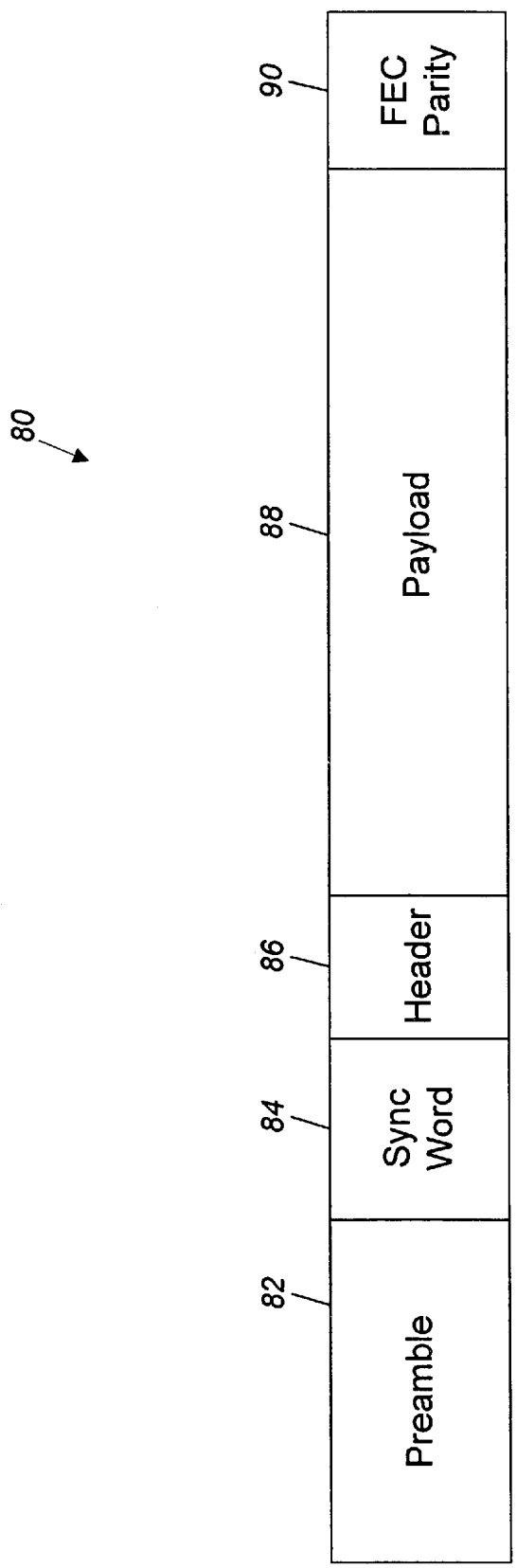
FIG. 5 is a diagram showing the components of an information packet transmitted in a spread spectrum communication system using CCSK modulation.

Referring now to FIG. 5, each packet 80 transmitted between the system controller 34 and one of the end point devices 32 in the wireless network 30 of FIG. 1 should have a known structure to ensure that it will be recognized and properly decoded by the intended recipient device. Therefore, each packet 80 will include a preamble 82 consisting of multiple repetitions of the primary PN sequence. The preamble 82 allows the receiver to recognize that a packet has been sent and to synchronize to the phase of the PN sequence used in generating the packet (i.e., the "transmission phase"). Increasing the length of the preamble increases the chances of accurately detecting each packet, but also increases the total duration of each packet and therefore decreases the overall efficiency of the network.

Once detected, the incoming PN transmission phase serves as a reference phase for all subsequent data demodulation, as described in more detail below.

Following the preamble 82 is a 2-CCSK synchronization ("sync") word 84, which consists of multiple known symbols (each carrying one bit of binary data) that indicate to the receiver that data delivery is about to begin. The sync word 84 also allows the receiver to discard most erroneous packets not otherwise detected. Encoding the sync word 84 as 2-CCSK provides a slight gain in sensitivity over the 16-CCSK modulation used to encode the digital data that follows. The sync word 84 may consist of a Barker code encoded using the first two code phases ("symbol 0" and "symbol 1") of the sixteen symbol alphabet described above.

Following the sync word 84 is a header 86 of known length that contains an address field indicating the address of the source of the packet. The address field also may indicate the address of the intended recipient of the packet. The header 86 also includes a length field indicating the length of the data payload to follow. The header 66 also may contain control bits.

Following the header is the data payload portion 88 of the packet 80, which may include up to 255 symbols of 16-CCSK modulated data per byte in the length field of the header. Following the data payload portion 88 is FEC parity information 90 for use in detecting and correcting packet corruption.

Figure 6:
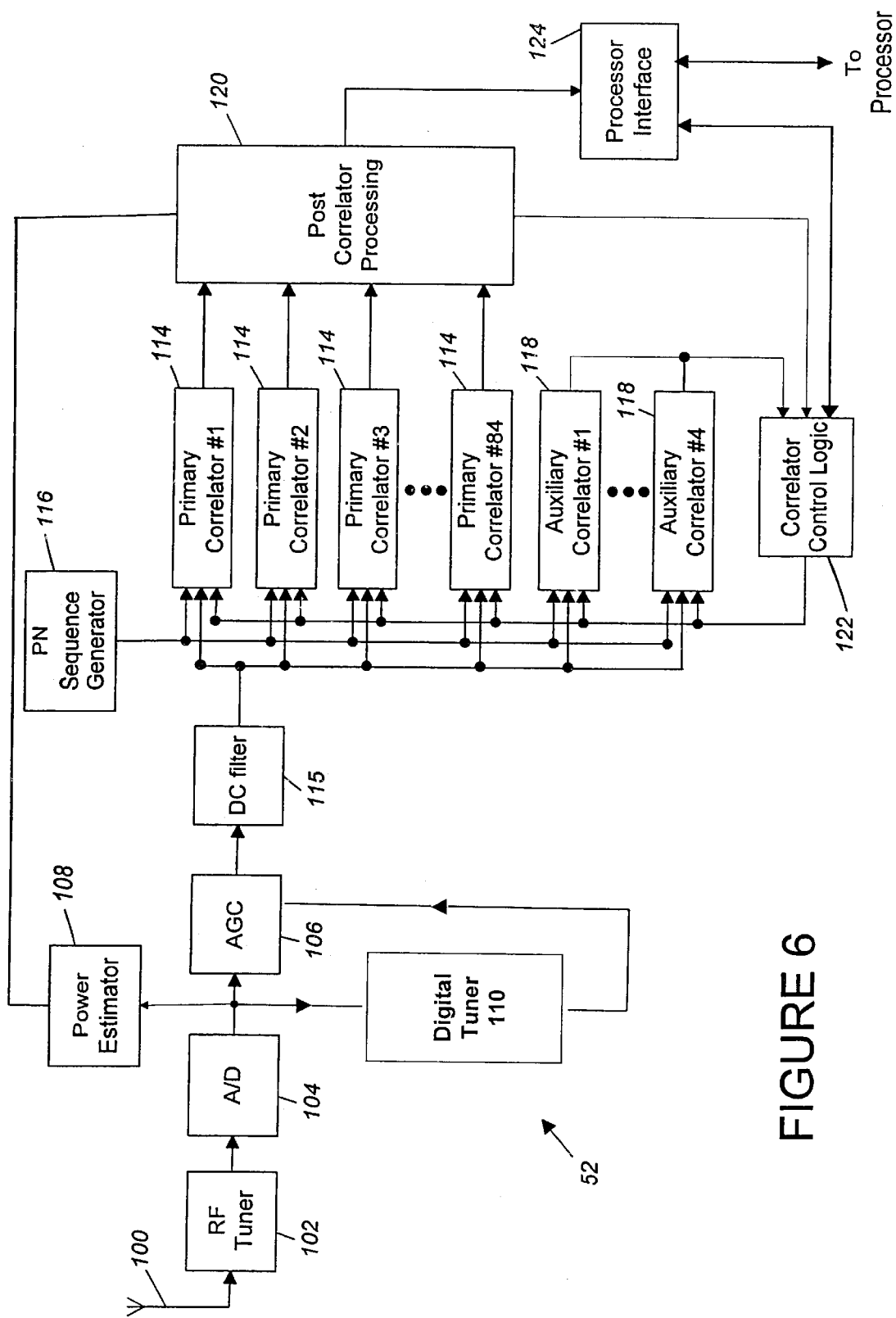
FIG. 6 is a block diagram of a receiver for use in a spread spectrum communication system.

Referring now to FIG. 6, the receiver 52 includes an antenna 100 coupled to a standard RF tuner 102, which down converts the received signal from the RF carrier to the IF carrier and adjusts the power level of the signal, if necessary, to ensure that it falls within a range suitable for analog-to-digital (A/D) conversion. The down converted analog signal then is provided to an A/D converter 104, which samples the signal at a sampling rate ($F_s$) eight times the chip rate of the PN spreading sequence. In other words, for a 63-bit PN sequence having a chip rate of 1.2 MHZ, the A/D converter 104 samples the incoming signal at a rate of approximately 9.6 MHZ, or eight samples per chip (8x over sampling). The A/D converter 104 performs a "fixed conversion" which allows the A/D converter 104 to output the sampled spread spectrum signal at a second intermediate carrier frequency lower than the sampling rate. Ideally, the second IF carrier frequency equals approximately one-quarter the sampling frequency ($F_s/4$). Converting the incoming digital signal to $F_s/4$ provides several advantages, such as 1) allowing the use of an AC-coupled filter 115 (or "DC block") to eliminate DC offset introduced by the RF tuner 102, the A/D converter 104, and the AGC circuit 106; 2) allowing the use of implementation efficient bandpass correlators, as described below; and 3) allowing extraction of the in-phase and quadrature components through a deinterleaving process. The digital tuner 110 may down convert the digital signal to any other fractional frequency of the sampling frequency, provided that the upper end of the digital signal's bandwidth remains below $F_s/2$ and the lower end of the bandwidth remains high enough to allow the AC-coupled filter 115 to remove unwanted DC offset. The A/D converter 104 provides its digital output to an automatic gain control (AGC) circuit 106, which keeps the amplitude of the digital signal within an appropriate range, and to a power estimation block 108, which calculates the total energy of the digital signal. The output of the power estimation block 108 is used by the receiver 52 to evaluate whether a packet has been received, as discussed below, and to provide information to an AGC algorithm performed by the processor.

The digital signal, centered at $F_s/4$, is provided to a bank of eighty-four primary correlators 114, some of which are used in each of the three stages (or "modes") of the receiver's operation: search/qualification, acquisition, and demodulation. Each of the primary correlators 114 compares the incoming digital signal against a particular code phase of the PN sequence, a copy of which is provided to the primary correlator 114 by a PN sequence generator 116. As described in more detail below, the primary correlator 114 correlates the incoming signal with the copy by multiplying the two signals to form a product signal. If the code phases are aligned, the product signal is a DC signal having a value of "1". Each primary correlator 114 integrates its product signal over the symbol period to form a correlation output, which generally will have a high magnitude relative to noise if the signals are aligned and a low magnitude relative to noise otherwise. An implementation efficient bandpass correlator structure is described in detail below.

The digital signal, centered at $F_s/4$, also is provided to four auxiliary correlators 118, which are used to verify potential signal detections ("trips") produced during the search/qualification mode, and to fine-tune the receiver to the frequency of the incoming signal during the acquisition mode. Each of the auxiliary correlators 118 should be able to receive a copy of the PN sequence at any one of the possible code phases and should be individually tunable over the desired frequency range discussed below. The auxiliary correlators 118 may use the implementation efficient bandpass correlator structure described below.

A post-correlator processing block 120 continuously monitors the outputs of the primary correlators 114 and identifies correlation peaks, each of which indicates that the code phase of the PN sequence in one of the primary correlators 114 may have matched the incoming signal during a symbol period. During the search/qualification mode, the processing block 120 produces a trip signal indicating when a correlation output may indicate a signal trip. The processing block 120 also includes a series of comparators which, during the demodulation mode, rank the correlation outputs during each symbol period according to magnitude. This information is used by the processor to demodulate the incoming data.

A correlator control logic block 122 controls operation of the correlators during the three modes of operation. The control logic block 122 includes a state machine that steps through the three operation modes and digital circuitry that supplies control signals to each of the correlators 114 and 118, according to instructions from the processor (not shown in FIG. 6). A processor interface 124 allows the post-correlator processing block 120 and the control logic block 122 to provide information to the processor and allows the processor to provide instructions to the correlator control logic block 122.

During the search/qualification mode, the receiver 52 must detect and recognize potential DSSS signals existing in the wireless network. During the acquisition mode, the receiver 52 must align to the transmission phase and frequency of the incoming signal. During demodulation, the receiver 52 must determine whether it is the intended recipient of the incoming signal and, if so, accurately demodulate the digital data contained in the signal.

As discussed above, the DSSS signals transmitted in the wireless network may consist of a carrier wave in the ISM band multiplied by a 63-chip PN sequence. To acquire one of these signals during the search and qualification mode, the receiver 52 must correlate the received signal with a local copy of the PN sequence that is almost perfectly aligned with the code phase of the original PN sequence. However, at minimal detectable signal levels the receiver 52 typically cannot recognize that a signal is present until after code phase alignment has occurred. Therefore, the process of alignment must proceed by trial and error.

Further complicating the search process are potential errors in the carrier frequency generated by the transmitter or the receiver's tuning frequency. In a typical wireless network the potential carrier error may be greater than ±50 kHz, so the receiver may need to search over a frequency range greater than 100 kHz centered at the nominal carrier frequency. In general, the receiver can detect signals only by searching an area defined by the PN sequence length and the carrier uncertainty by trial-and-error, and it must do so within a time defined by the packet preamble, leaving enough preamble time to align itself with the transmission phase of the incoming signal.

Typically, each primary special correlator 114 will respond with a maximum sensitivity loss of 4 dB to any signal within ±3/8 chip and ±5 kHz of its code phase and frequency settings. The measurement of a correlator's response will be available once per symbol period, as described in more detail below. Therefore, each primary correlator 114 can search an area of 3/4 chip and 10 kHz during one symbol period. To ensure that the entire 63-chip range is searched during each symbol period and that the entire code/frequency range is searched in a reasonable time, eighty-four primary correlators 114 are required [(63 chips) ÷(3/4 chip per correlator)=84 correlators], each tuned to one of eighty-four search phases separated by 3/4 chip.

The correlator control logic block 122 automates the search process. The control logic 122 initializes each of the primary correlators 114 to a corresponding one of the eighty-four possible 3/4 chip search phases of the PN sequence and to the nominal carrier frequency, as commanded by the processor. The primary correlators 114 each include frequency adjustment elements, as described below. Each primary correlator 114 correlates the corresponding search phase of the PN sequence against the incoming digital signal for a symbol period, dumps its correlation output, and immediately begins correlating again against the digital signal over the next symbol period. The search frequency of each primary correlator 114 is increased by 10 kHz at the end of each symbol period until it reaches the upper end of the carrier uncertainty range and then is decreased by 10 kHz per symbol period until the lower end of the range is reached, and so on, until a signal is acquired.

The post-correlator processing block 120 monitors the correlation outputs at the end of each symbol period and generates a trip signal if any of the correlation outputs is sufficiently high. The processing block 120 does not generate a trip signal unless one of the correlation outputs, normalized to the output of the power estimator block 108, exceeds a predetermined threshold. This threshold depends upon the characteristics of the network in which the receiver 52 is used, and factors such as the minimum detectable signal level and the false trip rate may be taken into account.

When the correlator control logic block 122 receives a trip signal, it commands one of the four auxiliary correlators 118 to qualify the trip while the primary correlators 114 continue searching. The control logic 122 sets the assigned auxiliary correlator to the frequency at which the trip occurred and instructs the PN sequence generator to provide the auxiliary correlator 118 with a copy of the PN sequence at the search phase associated with the trip. To qualify the trip, the auxiliary correlator correlates the incoming digital signal against the PN sequence at the selected search phase over successive symbol periods. The correlation over a given symbol period is a "success" if the correlation output of the auxiliary correlator 118, normalized to the output of the power estimator block 108, exceeds a predetermined threshold. The trip is qualified after three consecutive successful symbol periods. On the other hand, the auxiliary correlator 118 drops the trip and ends qualification after three consecutive unsuccessful correlating periods or after twelve symbol periods have passed without qualification. If no auxiliary correlators 118 are available when a trip signal occurs (i.e., if all four auxiliary correlators 118 are busy qualifying trips), the receiver queues the trip. When a trip signal is qualified, the primary correlators 114 stop searching and the receiver 52 enters the acquisition mode.

The acquisition mode consists of two phases: fine code search and fine frequency search. During fine code search, the receiver 52 sets each primary correlator 114 to the frequency of the qualified trip and sets each of the first sixteen primary correlators 114 to sixteen consecutive phases of the PN sequence separated by one sample. The eighth correlator correlates against the search phase of the qualified trip; the seven preceding correlators correlate against the seven phases, each separated by one sample, immediately preceding the search phase of the qualified trip; and the eight following correlators correlate against the eight phases, each separated by one sample, immediately following the search phase of the qualified trip. The sixteen correlators collect data for one symbol period, with each correlator's correlating period offset a sample behind the correlating period of the preceding correlator.

The outputs of the sixteen correlators undergo a special fine code correlation against an ideal relationship between code phase error and correlator response. This special correlation indicates which offset from the code phase of the qualified trip most closely correlates to the ideal response, which is considered over a range of ±4 samples from perfect code alignment. A normalized ideal response (R) at each sample offset is represented by the following equation:

$$R_i = (1 - 64i/504)^2,$$

where i is the offset in samples and $-4 \leq i \leq 4$. The correlation (C) of each sample offset against the ideal response then is determined by the following equation:

$$C_j = \Sigma R_i \cdot O_{i+j+7},$$

where $O_k$ is the output of the $k^{th}$ correlator ($0 \leq k < 16$), where i and j represent the offset in samples ($-4 \leq i,j \leq 4$). For $j=-4$ and $i=-4$, "i+j" is less than zero, so the special correlation value at these offset values is disregarded. The best-fit code phase is the one for which the corresponding correlation value ($C_j$) is largest ("code phase zero" or "data phase zero"). The receiver 52 continues to qualify any outstanding search trips during fine code search but terminates trip qualification when the fine code search stage is successful.

In the fine frequency search phase, which begins after the fine code search is successful, the four auxiliary correlators 118 are used to find the peak of the frequency response to the incoming signal. Each of the auxiliary correlators 118 is set to code phase zero, as determined in the fine code search phase, and to one of several frequencies near the frequency of the qualified trip. Each auxiliary correlator 118 then provides an output representing a point on a frequency response curve, the peak of which represents the signal frequency and may be calculated by the processor.

The receiver 52 also incorporates false peak rejection to ensure that it does not lose valid data packets after detecting and qualifying "false" peaks that may occur at code phases and/or frequencies other than the actual phases and frequencies of the true signals. The processor will recognize a false peak when the signal-to-noise (S/N) ratio of the tripping signal does not improve beyond −13 dB during the fine code and fine frequency search phases. To reject false peaks and to avoid subsequent trips on false peaks from the same signal, the processor drops any signal for which the S/N ratio has not improved by 12 dB after the fine code and fine frequency search phases and sets the trip threshold 6 dB higher than normal during the subsequent search process. Increasing the threshold in this manner should allow the receiver 52 to detect the true peak of a strong signal while ignoring the false peaks.

When the fine code and fine frequency search phases are complete, the receiver 52 begins watching for the sync word. Because the sync word is encoded with 2-CCSK modulation, as described above, the correlator control logic 122 assigns only two primary correlators 114 to monitor the incoming signal for the sync word. The two assigned correlators are the correlator associated with code phase zero, as determined in the fine code search phase, and the correlator immediately following it. The two correlators then correlate the incoming signal against the corresponding code phase over the same correlation period. The correlation outputs of the two correlators are provided to the processor, which assigns each symbol in the sync word a soft value $S_i$ according to the equation:

$$S_i = (A_i - B_i)/(A_i + B_i),$$

where $A_i$ and $B_i$ represent the correlation outputs of the two correlators at each symbol period. The processor stores up to thirteen soft values and, after each symbol period, forms a correlation sum (C) according to the equation:

$$C = \Sigma S_i \beta_i,$$

where the sum runs from i=0 to 12 and where $\beta_i$ represents the actual value of the $i^{th}$ bit of the synch word, with logic levels of ±1. The signal is declared synchronized when the correlation sum is greater than some predetermined threshold.

During the demodulation mode, sixteen of the primary correlators 114 correlate the incoming digital signal to the sixteen different code phases defining the 16-CCSK symbol alphabet, with the first correlator corresponding to code phase zero, as determined during the fine code search phase, and the following correlators successively corresponding to the other fifteen code phases. All sixteen correlators use the same correlation period in the demodulation mode. At the end of each symbol period, the post-correlator processor block 120 determines which correlators have the highest correlation outputs. The processor assigns a symbol value to the symbol period based on which correlator produces the highest correlation output. The processor may be programmed so that it does not assign a symbol value (i.e., it issues an "erasure") if the ratio of the highest correlation output to the second highest correlation output does not exceed some predetermined threshold.

During demodulation, the receiver also tracks the code phase of the incoming signal. Code phase tracking ensures that the receiver does not lose alignment with the signal as a result of clock drift that may affect the output of the PN sequence generator 116. To track the code phase, the correlator control logic 122 assigns thirty-two additional primary correlators 114, half of which provide "early" correlation values and the other half of which provide "late"

correlation values. Each "early" correlator is set to a code phase that is between one and four samples ahead of the code phase associated with one of the main demodulation correlators ("on-phase" correlators) discussed above. Each "late" correlator is set to a code phase that is between one and four samples behind the code phase associated with one of the on-phase correlators. The receiver 52 uses the correlation outputs of the early and late correlators associated with the on-phase correlator aligning to the incoming signal during each symbol period to calculate a code phase error (R), according to the equation:

$$R=(E-L)/O,$$

where E and L are the outputs of the early and late correlators and O is the output of the on-phase correlator. The code phase error may be used to update the clocking rate of the PN sequence generator 116 when the error is, e.g., greater than $\frac{1}{16}$ chip.

Figure 7A:
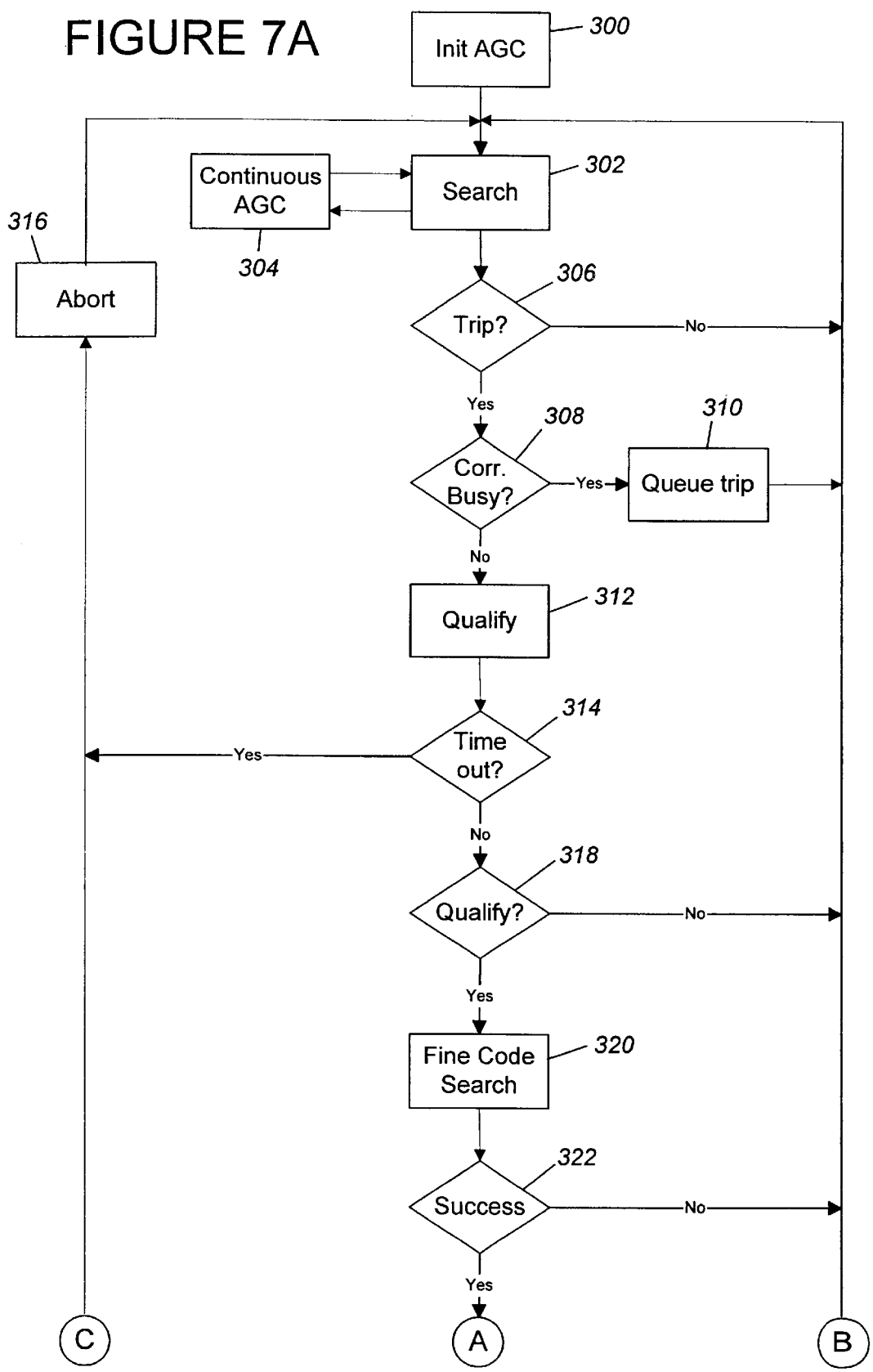
FIGS. 7A and 7B are flow diagrams of the operation of the receiver of FIG. 6 during search, acquisition, and demodulation of spread spectrum signals.
Figure 7B:
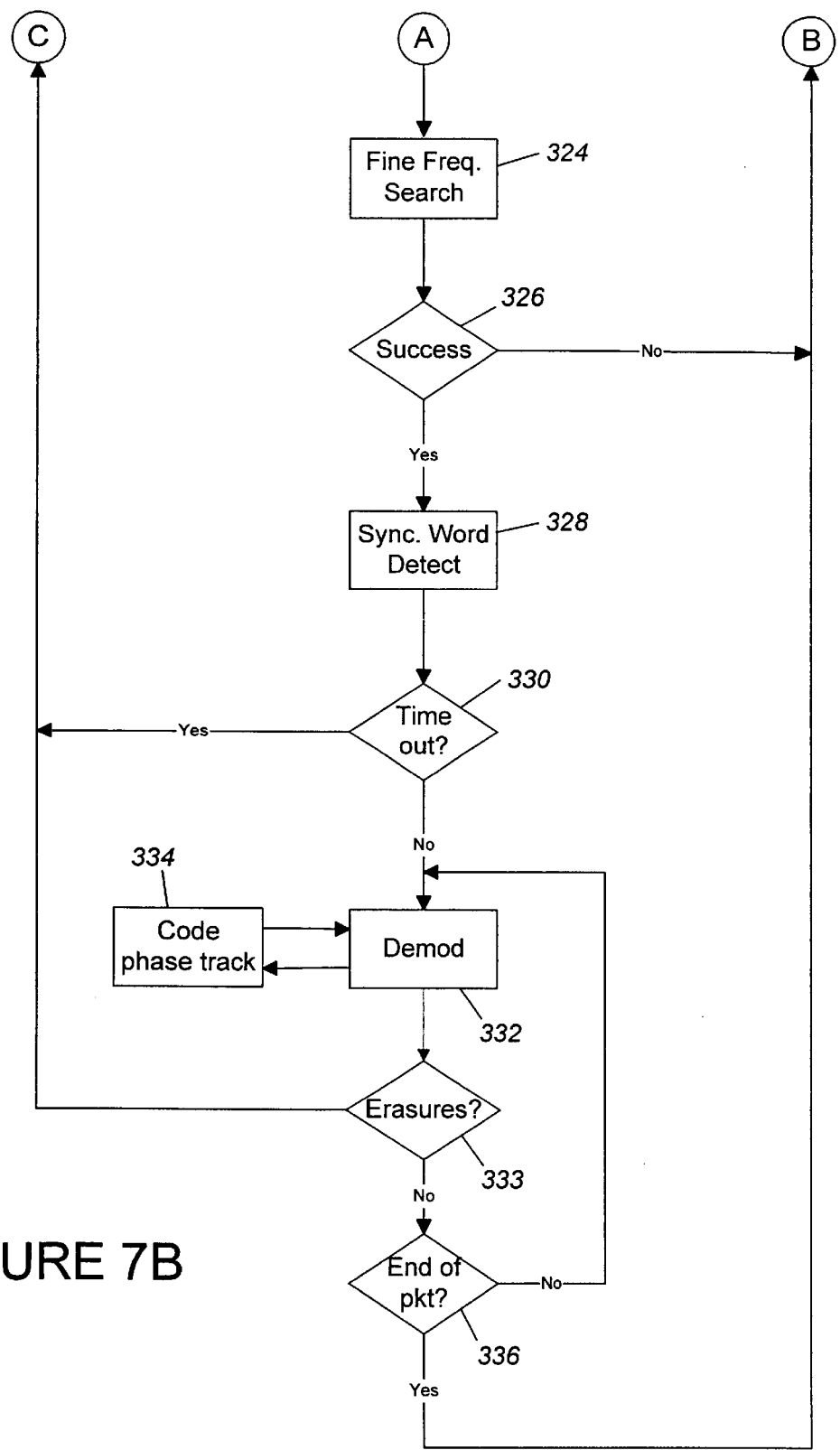

Referring also to FIGS. 7A and 7B, the receiver begins operation upon startup by initializing the automatic gain control circuit (step 300). The receiver then enters the search mode (step 302) and continuously searches for a DSSS signal, constantly monitoring and adjusting the AGC circuit (step 304), until a trip signal occurs (step 306). When a trip signal occurs, the receiver determines whether all of the auxiliary correlators are busy (step 308). If so, the receiver queues the trip signal (step 310) and continues searching (step 302); otherwise, the receiver assigns an auxiliary correlator to qualify the trip (step 312). The receiver then monitors the qualification process to determine whether the trip signal is qualified or rejected within the allotted period of time (steps 314 and 318). If neither qualification nor rejection occurs within twelve symbol periods, the receiver aborts the qualification process for that trip signal (step 316) and continues searching for DSSS signals (step 302). The receiver also continues searching if the trip signal is disqualified (step 318). If, on the other hand, the auxiliary correlator qualifies the trip signal, the receiver enters the acquisition mode.

In the acquisition mode, the receiver first assigns several primary correlators to carry out the fine code search (step 320). The receiver then monitors the assigned correlators to determine whether the code phase is successfully acquired (step 322). If not, the receiver returns to the search mode and resumes its search for DSSS signals (step 302); otherwise, the receiver instructs the auxiliary correlators to enter the fine frequency search phase (step 324). The receiver then monitors the four general correlators to determine whether the fine frequency search leads to successful acquisition of the frequency offset (step 326). If not, the receiver returns to the search mode and resumes searching (step 302); otherwise, the receiver prepares for sync word detection (step 328). If the expected sync word is not detected within the appropriate time limit, the sync word detection process times out (step 330) and is aborted (step 316), and the receiver again begins searching for DSSS signals (step 302). If the sync word is detected, the receiver enters the demodulation mode (step 332). In the demodulation mode, the receiver continuously tracks the code phase of the incoming data signal to prevent drift in alignment (step 334). If too many erasures occur during demodulation (step 333), the demodulation process is aborted (step 316) and the receiver again searches for DSSS signals (step 302). Otherwise, the receiver continues to demodulate data until the end of the transmitted packet (step 336). When the end of the packet is reached, the receiver leaves the demodulation mode, reenters the search mode, and again begins searching for DSSS signals (step 302).

Figure 8A:
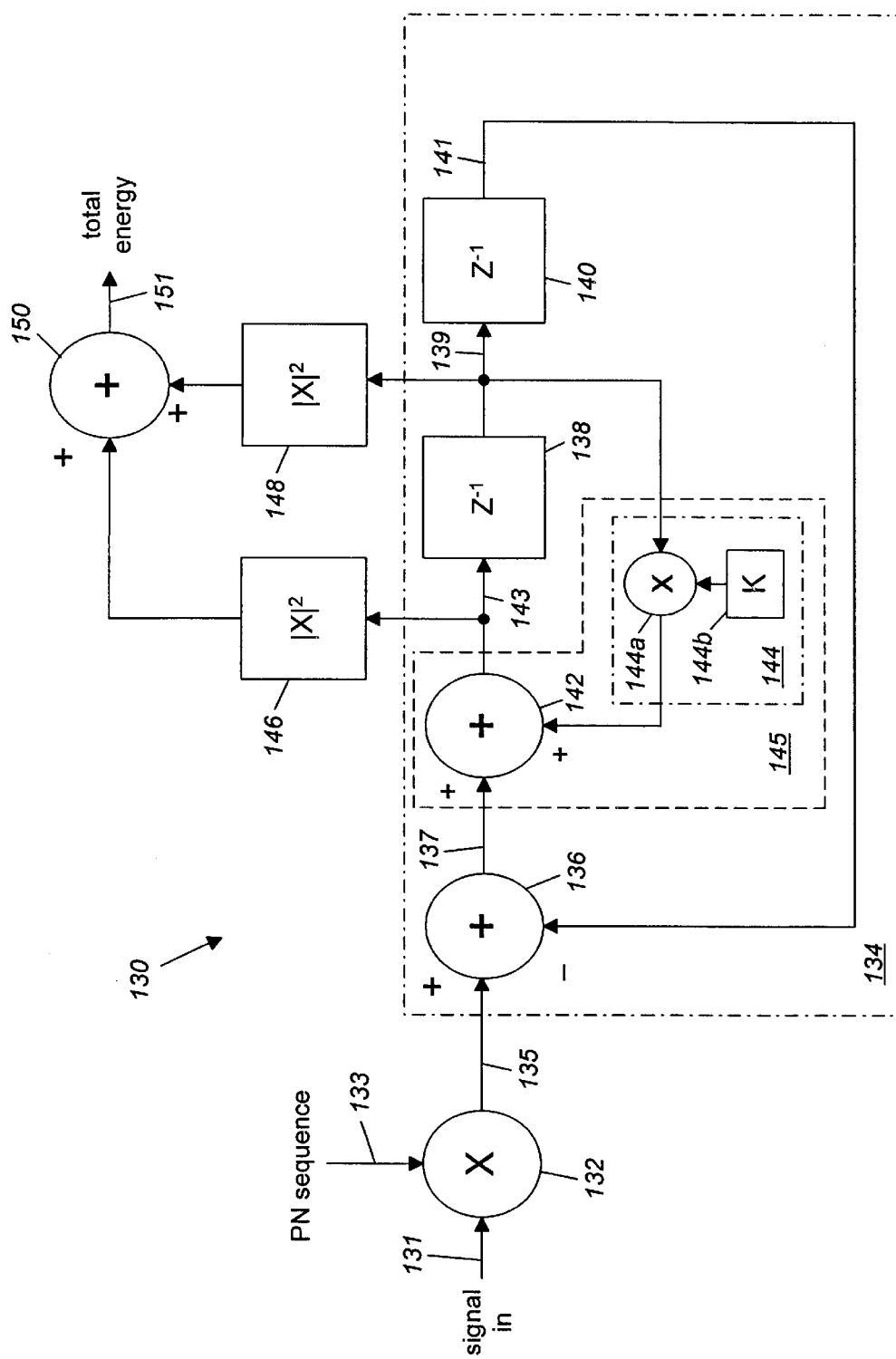
FIGS. 8A and 8B are block diagrams of implementation efficient correlators for use in recovering data from spread spectrum signals.

Referring now to FIG. 8A, each bandpass correlator (primary and auxiliary) in the receiver may utilize an implementation efficient (IE) correlator structure 130. As discussed above, the incoming digital signal 131 should enter the correlator at a carrier frequency equal to approximately one-quarter the digital sampling rate ($F_s/4$). The IE correlator structure provides approximate quadrature processing and frequency adjustment in a unified block that requires few and inexpensive components. The structure includes a digital multiplier 132 followed by an accumulation loop 134 having a primary summer 136 and two delay elements 138 and 140, both of which may be single sample delay registers. The output 141 of the second delay register 140 feeds back to the primary summer 136 and is subtracted from the product output 135 of the multiplier 132. The output 139 of the first delay register 138 feeds directly into the second delay register 140. Output 139 also may be provided to a frequency adjustment element 145 that allows the processor to adjust the resonant frequency of the accumulation loop 134. Within the frequency adjustment element 145, the output 139 of the first delay register 138 is scaled by a scaling element 144, fed back to a secondary summer 142, and added to the output 137 of the primary summer 136. The correlator structure 130 may be implemented in standard, off-the-shelf components, but it is particularly suited for implementation in an application specific integrated circuit (ASIC).

In operation, the incoming digital signal 131 and a local copy of the PN sequence 133 are provided as inputs to the multiplier 132. If the two are in code phase alignment, the code product always equals "1" and the output 135 of the multiplier is simply the $F_s/4$ carrier wave. Because the loop delay is two samples, the output 141 of the second delay register 140 is approximately 180° out-of-phase with the multiplier output 135 and therefore reinforces the multiplier output 135 in the primary summer 136 during the subtraction operation. The input 143 and the output 139 of the first delay register 138 differ by one sample time and therefore are approximately 90° out-of-phase, so they may be taken as the in-phase and quadrature components, respectively, of the $F_s/4$ carrier wave. At the end of the accumulation time (one correlation period), the in-phase and quadrature outputs are taken and the delay registers 138 and 140 both are set to zero to re-initialize the accumulation loop 134. The final output 151 is the sum of the squares of the in-phase and quadrature components at the end of each correlation period, as provided by squaring circuits 146 and 148 and adder 150.

Instead of a single-sample, register 140 may delay output 139 by multiple samples, so that the phase offset between output 135 and output 141 is a multiple of 180°. For example, a three sample delay in register 140 leaves output 141 360° out-of-phase with product output 135. In this case, primary summer 136 will add output 141 to product output 135 to form an accumulation output.

The frequency adjustment element 145 includes a scaling element 144, the scaling factor (K) of which is variable to allow for frequency adjustment within the correlator's accumulation loop 134. The scaling factor K has a value equal to $2 \cdot \cos(\Omega_0)$, where $\Omega_0$ represents $2\pi$ times the ratio of the desired resonant frequency of the accumulation loop 134 to the sampling rate ($F_s$) of the A/D converter 104 (the absolute value of K typically will be much less than one). The value of the scaling factor may be selected by the processor and stored in a programmable storage element 144b such as a register. A multiplication element 144a applies the scaling factor to the output 139 of the first delay register 138, and the resulting signal is added by the secondary summer 142 to the output 137 of the primary summer 136. When the scaling factor has a value of zero, the secondary summer 142 has no effect on the correlator structure. However, when the scaling factor is slightly above or below zero, the effective delay in the accumulation loop 134 is slightly greater than or less than two samples, so the loop response is centered at a frequency slightly below or slightly above $F_s/4$. Since the delay between the output 139 of delay element 138 and the output 141 of delay element 140 always remains at one sample, adjusting the scaling factor to a value other than zero introduces a small quadrature error at frequencies offset from $F_s/4$. At small frequency offsets, the quadrature error is insignificant.

Figure 8B:
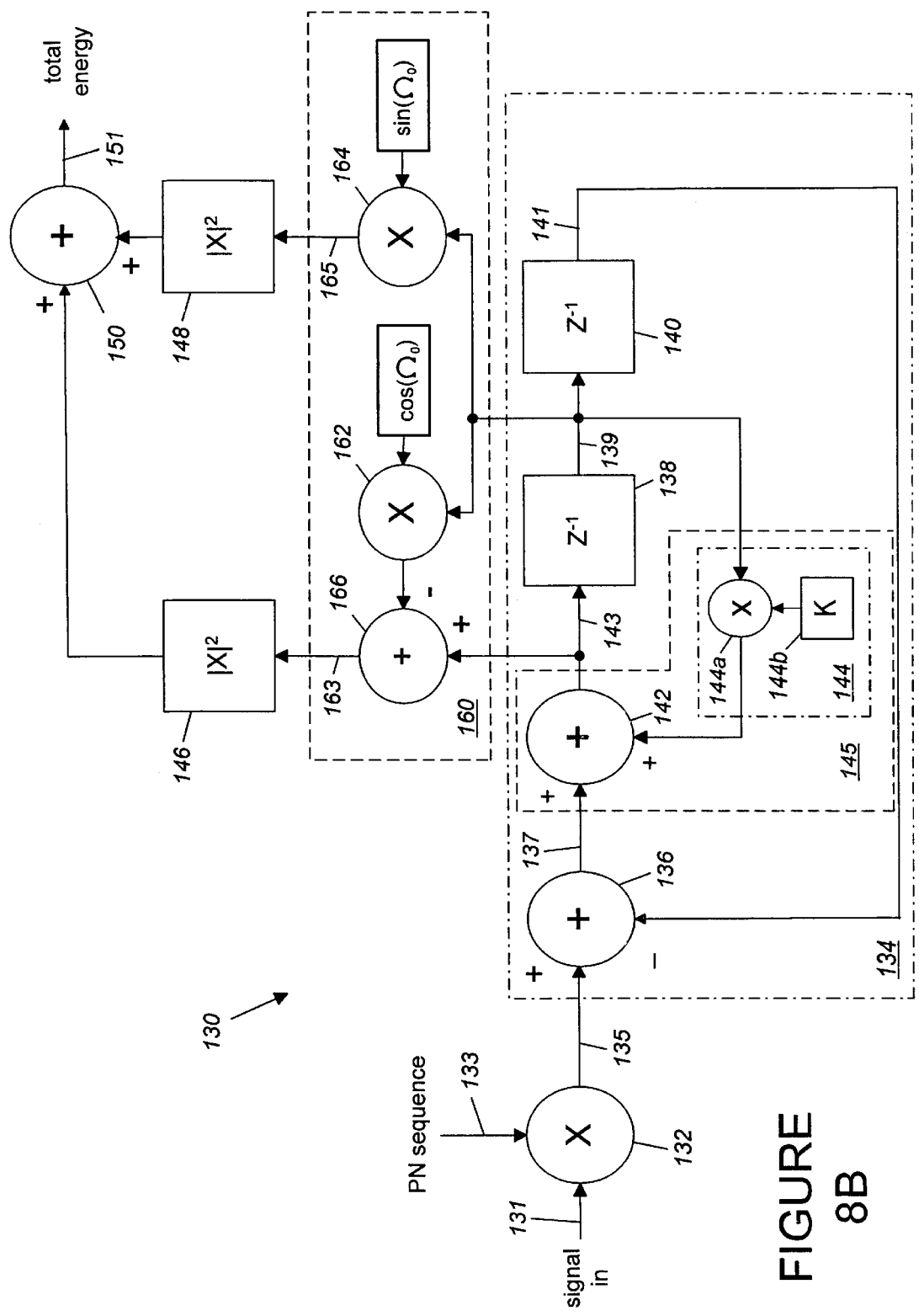

Referring to FIG. 8B, a quadrature error correction element 160 may be added to the correlator structure 130 to eliminate the quadrature error introduced by the scaling element 144. The correction element 160 includes two multiplication elements 162 and 164, which multiply the output 139 of the accumulation loop 134 with signals equal to $\cos(\Omega_0)$ and $\sin(\Omega_0)$. The output 165 of multiplication element 164 represents the corrected quadrature component of the accumulation output and is provided to squaring circuit 148. Summer 166 produces the corrected in-phase component of the accumulation output by subtracting the output 163 of multiplication element 162 from the output 143 of secondary summer 142. The corrected in-phase component is provided to squaring circuit 146.

Figure 9:
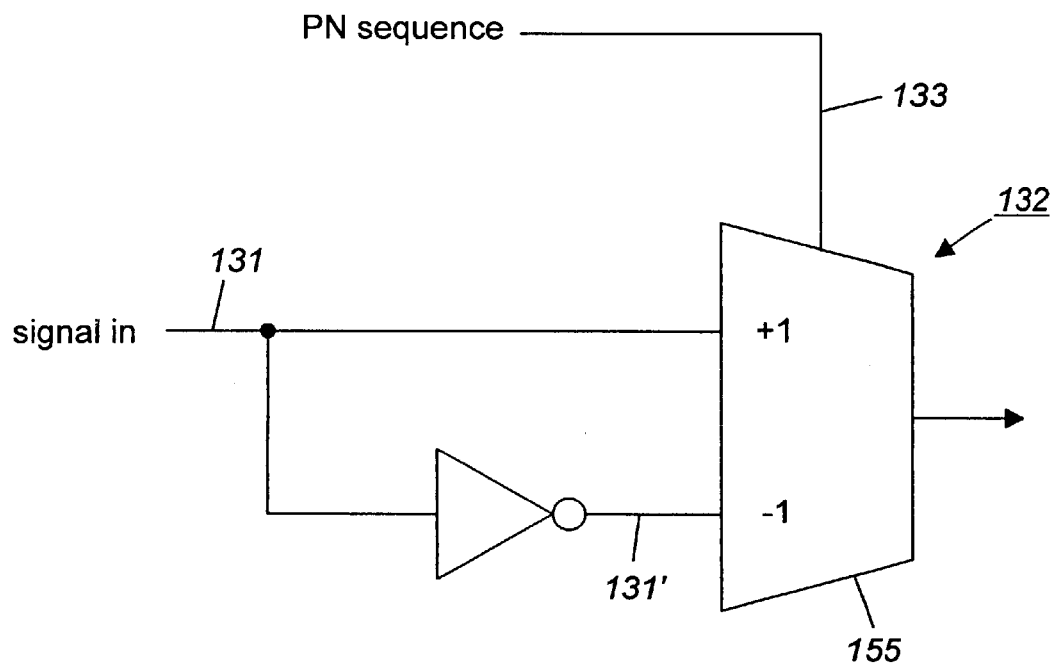
FIG. 9 is a schematic diagram of a sign inverter for use in the correlator of FIG. 8 in recovering data modulated onto direct sequence spread spectrum signals using cyclic code shift keying (CCSK) modulation.

Referring also to FIG. 9, when a binary PN sequence serves as the spreading signal, the digital multiplier 132 may be a simple sign inverter realized, e.g., as a digital multiplexer 155 receiving the incoming digital signal 131 and an inverted version 131' of this signal as inputs and having a local copy of the PN sequence 133 as its control signal. The non-inverted signal 131' is selected by the multiplexer 155 when the PN sequence 133 is high, and the inverted signal 131' is selected when the PN sequence 133 is low. When the incoming signal 131 and the PN sequence 133 are aligned, the PN sequence cancels the spreading signal from the incoming signal 131 and only the $F_s/4$ carrier wave exits the multiplexer 155.

Other embodiments are within the scope of the following claims.

What is claimed is:

1. An apparatus for use in processing a spread spectrum signal digitally sampled at a preselected sampling rate, the apparatus comprising:
   a tuning element configured to downconvert the digitally sampled spread spectrum signal to a preselected center frequency which is a whole number fraction of the preselected sampling rate, and which is always greater than zero;
   a multiplication element configured to multiply the digitally sampled spread spectrum signal against a reference signal to produce a corresponding product output at the preselected center frequency; and
   an accumulation element configured to produce an accumulation output by combining at the preselected center frequency the product output and a phase-shifted version of the product output.

2. The apparatus of claim 1, wherein the center frequency equals approximately one-quarter the sampling rate.

3. The apparatus of claim 1, wherein the accumulation element is configured to combine the product output and a 180° phase-shifted version of the accumulation output.

4. The apparatus of claim 3, further including a delay element configured to shift the accumulation output by two samples to produce the 180° phase-shifted version of the accumulation output.

5. The apparatus of claim 4, wherein the delay element includes two single-sample delay registers.

6. The apparatus of claim 1, wherein the accumulation element is configured to combine the product output and a 360° phase-shifted version of the accumulation output.

7. The apparatus of claim 6, further including a delay element configured to shift the accumulation output by four samples to produce the 360° phase-shifted version of the accumulation output.

8. The apparatus of claim 1, wherein the accumulation element is configured to combine the product output with a version of the accumulation output phase-shifted by N times 180°, where N is an integer greater than zero.

9. The apparatus of claim 1, further including an element configured to provide as output a quadrature component of the accumulation output.

10. The apparatus of claim 1, further including an element configured to provide as output an in-phase component of the accumulation output.

11. The apparatus of claim 1, wherein the multiplication element includes a digital multiplier.

12. The apparatus of claim 1, wherein the multiplication element includes a sign inverter.

13. A method for use in processing a spread spectrum signal digitally sampled at a preselected sampling rate, the method comprising:
   tuning the digitally sampled spread spectrum signal to a preselected center frequency which is a whole number fraction of the preselected sampling rate, and which is always greater than zero;
   multiplying the digitally sampled spread spectrum signal against a reference signal to produce a corresponding product output at the preselected center frequency; and
   producing an accumulation output by combining at the preselected center frequency the product output and a phase-shifted version of the product output.

14. The method of claim 13, wherein the center frequency equals approximately one quarter the sampling rate.

15. The method of claim 13, wherein producing the accumulation output includes combining a 180° phase-shifted version of the accumulation output with the product output.

16. The method of claim 13, further including shifting the accumulation output by two samples to produce the 180° phase-shifted version of the accumulation output.

17. The method of claim 13, wherein producing the accumulation output includes combining a 360° phase-shifted version of the accumulation output with the product output.

18. The method of claim 17, further including shifting the accumulation output by four samples to produce the 360° phase-shifted version of the accumulation output.

19. The method of claim 13, wherein producing the accumulation output includes combining the product output with a version of the accumulation output phase-shifted by N times 180°, where N is an integer greater than zero.

20. The method of claim 13, further including providing as an output a quadrature component of the accumulation output.

21. The method of claim 13, further including providing as an output an in-phase component of the accumulation output.

22. An apparatus for use in processing a spread spectrum signal digitally sampled at a preselected sampling rate, the apparatus comprising:
   a digital multiplier configured to multiply the digitally sampled spread spectrum signal with a reference signal to produce a product output that includes only a carrier wave at a preselected center frequency when the digitally sampled spread spectrum signal and the reference signal are aligned, the preselected center frequency being a whole number fraction of the preselected sampling rate that is always greater than zero; and an accumulation loop including:
   a primary summer configured to receive the product output; and
   two single-sample delay registers positioned in series after the primary summer, a first one of which receives its input from the primary summer and a second one of which provides its output to the primary summer for subtraction form the product output.

23. The apparatus of claim 22, further including:

two squaring circuits configured to square the magnitudes of outputs from the two delay registers; and an adding circuit configured to add the squared magnitudes to produce a squared correlation value.

* * * * *